(12) United States Patent
Zhang et al.

(10) Patent No.: US 11,538,286 B2
(45) Date of Patent: Dec. 27, 2022

(54) METHOD AND APPARATUS FOR VEHICLE DAMAGE ASSESSMENT, ELECTRONIC DEVICE, AND COMPUTER STORAGE MEDIUM

(71) Applicant: BEIJING BAIDU NETCOM SCIENCE AND TECHNOLOGY CO., LTD., Beijing (CN)

(72) Inventors: Wei Zhang, Beijing (CN); Xiao Tan, Beijing (CN); Hao Sun, Beijing (CN); Shilei Wen, Beijing (CN); Errui Ding, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 469 days.

(21) Appl. No.: 16/710,464

(22) Filed: Dec. 11, 2019

(65) Prior Publication Data
US 2020/0357196 A1    Nov. 12, 2020

(30) Foreign Application Priority Data
May 6, 2019   (CN) .......................... 201910372962.2

(51) Int. Cl.
*G07C 5/00*   (2006.01)
*G06N 3/04*   (2006.01)
(Continued)

(52) U.S. Cl.
CPC ........... *G07C 5/008* (2013.01); *G06N 3/0454* (2013.01); *G06Q 10/20* (2013.01); *G06V 20/10* (2022.01)

(58) Field of Classification Search
CPC ....... G07C 5/008; G06N 3/0454; G06Q 10/20
See application file for complete search history.

(56) References Cited

U.S. PATENT DOCUMENTS 9,824,453 B1 * 11/2017 Collins ............... G06F 16/5838
11,288,789 B1 * 3/2022 Chen ..................... G06T 7/0032
(Continued)

FOREIGN PATENT DOCUMENTS

CN    107392218 A    11/2017
CN    108921068 A    11/2018
(Continued)

OTHER PUBLICATIONS

App# CN 201811014381.3 filed Aug. 31, 2018; retrived from https://patentscope.wipo.int/search/en/detail.jsf?docId=CN279765869&_cid=P12-L2PEQG-76274-1 (Year: 2018).*

*Primary Examiner* — Calvin Cheung
(74) *Attorney, Agent, or Firm* — Knobbe, Martens, Olson & Bear LLP

(57) ABSTRACT

A method and apparatus for vehicle damage assessment, an electronic device, and a computer-readable storage medium are provided. The method may include: extracting, from an input image, a first feature characterizing a part of a vehicle and a second feature characterizing a damage type of the vehicle; integrating the first feature and the second feature to generate a third feature characterizing a corresponding relation between the part and the damage type; converting the third feature into a characteristic vector; and determining a damage recognition result based on the characteristic vector. According to the technical solution of the disclosure, users can rapidly and accurately learn about the damage condition of the vehicle by providing pictures or videos of the damaged vehicle, thus providing an objective basis for subsequent damage assessment, claim settlement, and repair.

15 Claims, 4 Drawing Sheets

(51) Int. Cl.
*G06Q 10/00* (2012.01)
*G06V 20/10* (2022.01)

(56) References Cited

U.S. PATENT DOCUMENTS

| | | | | |
|---|---|---|---|---|
| 2017/0293894 A1* | 10/2017 | Taliwal | ................ | G06V 10/462 |
| 2018/0260793 A1* | 9/2018 | Li | ........................ | G06N 7/005 |
| 2018/0293552 A1* | 10/2018 | Zhang | .................. | G06V 10/454 |
| 2018/0350163 A1 | 12/2018 | Pofale | | |
| 2019/0073641 A1* | 3/2019 | Utke | .................... | G06K 9/6271 |
| 2019/0095877 A1* | 3/2019 | Li | ........................ | G06N 3/0454 |
| 2020/0074178 A1* | 3/2020 | Guo | ........................ | G06V 20/00 |

FOREIGN PATENT DOCUMENTS

| | | |
|---|---|---|
| CN | 108985343 A | 12/2018 |
| CN | 109215027 A | 1/2019 |
| CN | 109325531 A | 2/2019 |
| CN | 109635742 A | 4/2019 |
| CN | 109657599 A | 4/2019 |

\* cited by examiner

METHOD AND APPARATUS FOR VEHICLE DAMAGE ASSESSMENT, ELECTRONIC DEVICE, AND COMPUTER STORAGE MEDIUM

CROSS-REFERENCE TO RELATED APPLICATIONS

This application claims priority to Chinese Patent Application No. 201910372962.2, filed on May 6, 2019, titled "Method and Apparatus for Vehicle Damage Assessment, Electronic Device and Computer Storage Medium," which is hereby incorporated by reference in its entirety.

TECHNICAL FIELD

Embodiments of the disclosure mainly relate to the field of computers, in particular to a method and apparatus for vehicle damage assessment, an electronic device, and a computer-readable storage medium.

BACKGROUND

At present, judgments on vehicle damage claims (namely, damage assessment services) mainly depend on manual work. For example, an investigator conducts on-site inspection and judgement at the scene of a vehicle accident, or a user takes pictures of the scene of the vehicle accident or establish a video connection with the staff of insurance companies. Automatic intelligent damage assessment services are on the rise. For example, for conventional intelligent damage assessment services, the damage assessments are performed by combining the feature extraction for images input by the users, and end classifiers (such as SVM or xgboost). However, feature extraction training and classifier training are independent of each other in this damage assessment method, and the classifier training cannot provide guidance for feature extraction training, thus, severely affecting the performance. In addition, this conventional damage assessment method is time-consuming and laborious due to the fact that extracted features need to be cached. A solution capable of realizing synchronous recognition of damaged parts and damage types on the basis of full-link deep learning is not yet available for existing vehicle damage assessment services.

SUMMARY

A solution for vehicle damage assessment is provided according to embodiments of the disclosure.

In a first aspect of the disclosure, a method for vehicle damage assessment is provided. The method includes extracting, from an input image, a first feature characterizing a part of a vehicle and a second feature characterizing a damage type of the vehicle. In addition, the method further includes integrating the first feature and the second feature to generate a third feature characterizing a corresponding relation between the part and the damage type. The method further includes converting the third feature into a characteristic vector, and determining a damage recognition result of the vehicle based on the characteristic vector.

In a second aspect of the disclosure, an apparatus for vehicle damage assessment is provided. The apparatus includes a feature extraction module configured to extract a first feature characterizing a part of a vehicle and a second feature characterizing a damage type of the vehicle from an input image. The apparatus further includes a feature integration module configured to integrate the first feature and the second feature to generate a third feature which characterizes a corresponding relation between the part and the damage type. In addition, the apparatus further includes a feature conversion module configured to convert the third feature into a characteristic vector. The apparatus further includes a damage recognition module configured to determine a damage recognition result of the vehicle based on the characteristic vector.

In a third aspect of the disclosure, a device is provided. The device includes one or more processors; and a storage apparatus configured for storing one or more programs, where the one or more programs, when executed by the one or more processors, cause the one or more processors to implement the method of the first aspect.

In a fourth aspect of the disclosure, a computer-readable storage medium having a computer program stored therein is provided. The computer program, when executed by a processor, causes the processor to implement the method of the first aspect.

It should be understood that, the content described in the Summary section is neither intended to limit key or important features of embodiments of the present disclosure, nor limit the scope of the present disclosure. Other features of the present disclosure will be readily understood by the following description.

BRIEF DESCRIPTION OF THE DRAWINGS

The above-mentioned features, advantages and aspects as well as other features, advantages, and aspects of embodiments of the disclosure will become more apparent in combination with the accompanying drawings and the following detailed description. In the drawings, identical or similar reference signs represent identical or similar elements, wherein.

DETAILED DESCRIPTION OF EMBODIMENTS

Figure 1:
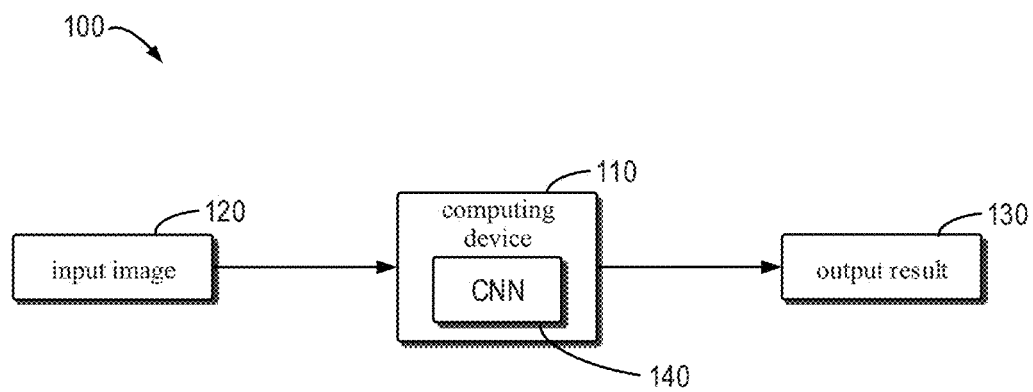
FIG. 1 is a schematic diagram of an example environment in which multiple embodiments of the disclosure can be implemented.

Embodiments of the disclosure will be further described in detail below with reference to the accompanying drawings. Although certain embodiments of the disclosure are shown in these accompanying drawings, it may be understood that the disclosure can be implemented in various forms, rather than be explained to be limited to the embodiments described herein. In fact, these embodiments are provided to fulfill a more comprehensive and complete understanding of the disclosure. Thus, it should be noted that the accompanying drawings and embodiments of the disclosure are only illustrative, and are not intended to limit the protection scope of the disclosure.

In the description of embodiments of the disclosure, the term "include" and similar terms thereof should be interpreted as non-exclusive inclusion, namely "include, but is not limited to". The term "based on" should be interpreted as "at least partially based on". The term "one embodiment" or "the embodiment" should be interpreted as "at least one embodiment". The terms "first", "second", and the like may refer to different or identical objects. Other explicit or obscure definitions may also be involved in the following description.

As mentioned above, there is an urgent need for a method for a vehicle damage assessment to rapidly and efficiently acquire a vehicle damage recognition result at a low cost to reduce time and labor costs of vehicle damage assessment. Conventional vehicle damage assessment methods generally concentrate on feature extraction of received vehicle damage images. For instance, features relating to vehicle damage are extracted from images by means of a deep learning model based on a convolutional neural network (CNN); and then, the damage type is determined by means of a classifier (such as SVM or xgboost). However, due to the fact that the classifier is unable to provide guidance for feature extraction training, the performance is severely affected. In addition, such damage assessment method is not end-to-end, and the features extracted need to be cached, thus, resulting in a long waiting time.

In one embodiment of the disclosure, an image-based vehicle damage assessment solution is provided. According to this solution, a damage recognition result of a damaged vehicle is determined based on one or more input images. The damage recognition result is associated with a first feature characterizing a part of the vehicle and a second feature characterizing a damage type of the vehicle. Specially, a feature relating to a part of the vehicle and a feature relating to the damage type of the vehicle are extracted from input images or videos. Then, the two features are integrated to obtain a characteristic vector containing both the recognized vehicle part and the recognized damage type, and the damage recognition result is determined based on the characteristic vector. In this way, users can rapidly and accurately learn about the damage condition of the vehicle by providing images or videos of the damaged vehicle, which facilitates providing an objective basis for subsequent damage assessment, claim settlement, and repair.

Embodiments of the disclosure are specifically described below with reference to the accompanying drawings. FIG. 1 is a schematic diagram of an example environment 100 in which multiple embodiments of the disclosure can be implemented. As shown in FIG. 1, the example environment 100 includes a computing device 110, an input image 120, and an output result 130. The computing device 110 includes a convolutional neural network (CNN) 140. The input image 120 may be an image related to a damaged vehicle and input by a user, such as a picture of the damaged vehicle. Alternatively or additionally, the input image 120 is a multi-frame image of the damaged vehicle, namely a video. The computing device 110 receives the input image 120, and a damaged part of the damaged vehicle, and the damage type of a damaged area are determined by the CNN 140 in the computing device 110. Afterwards, the computing device 110 outputs the name of the damaged part and the name of the damage type to the user.

In FIG. 1, the key for generating the output result 130 based on the input image 120 involves the following two aspects: first, the CNN 140 in the computing device 110 is constructed by means of pre-training, and the construction and usage of the CNN 140 will be described below with reference to FIG. 2; and second, a first convolutional neural network and a second convolutional neural network in the CNN 140 extract the features of the input image 120 respectively, are the extracted features are integrated by a third convolutional neural network in the CNN 140, and are finally converted into a characteristic vector. The multiple networks in the CNN 140 and connection relations thereof will be detailed below with reference to FIG. 3.

Figure 2:
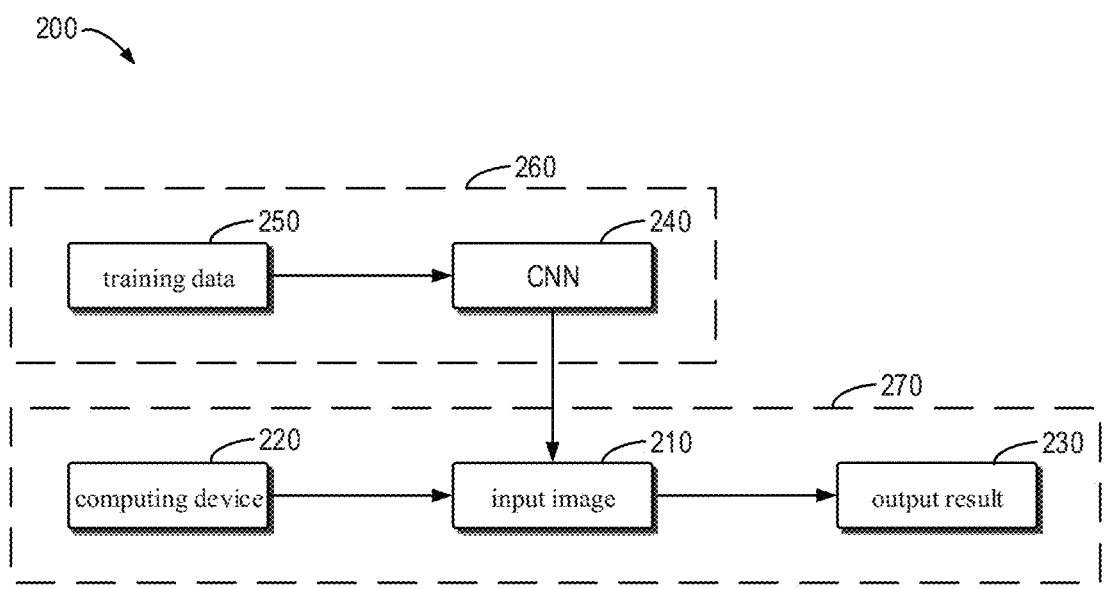
FIG. 2 is a schematic diagram of a detailed example environment in which multiple embodiments of the disclosure can be implemented.

FIG. 2 is a schematic diagram of a detailed example environment 200 in which some embodiments of the disclosure are implemented. Similar to the example environment in FIG. 1, the example environment shown in FIG. 2 includes a computing device 210, an input image 220, and an output result 230. Different from the example environment in FIG. 1, overall, the example environment shown in FIG. 2 includes a model training system 260 and a model application system 270 For example, the model training system 210 and/or the model application system 220 are/is implemented by the computing device 100 shown in FIG. 1 or the computing device 200 shown in FIG. 2. It should be understood that the structure and function of the example environment 200 are only illustrative, and are not intended to limit the scope of the subject matter of the disclosure. The subject matter described in the disclosure can be implemented in different structures and/or different functions.

As mentioned above, the vehicle damage assessment solution of the disclosure may be divided into two stages: a model training stage and a model application stage. In the model training stage, the model training system 260 trains a CNN 240 for vehicle damage assessment by using a training dataset 250. In the model application stage, the model application system 270 receives the trained CNN 240 and the input image 220 to generate the output result 230. In some embodiments, the training dataset 250 includes a huge quantity of images of damaged vehicles.

It should be understood that the CNN 240 can be constructed as a learning network for vehicle damage assessment, and such learning network is called a learning model or is abbreviated as a network or model. In some embodiments, the learning network for vehicle damage assessment includes a plurality of networks, and each of the networks is a multi-layer neural network consisting of a large quantity of neurons. Corresponding parameters of the neurons in each neural network can be determined through a training process. The parameters of the neurons in these networks are collectively referred as parameters of the CNN 240.

The training process of the CNN 240 can be performed by means of iteration. Specially, the model training system 260 acquires at least one image of the damaged vehicle from the training dataset 250, and one iteration of the training process is carried out using the at least one image to update the corresponding parameter of the CNN 240. The model training system 260 repeats this process based on multiple images acquired from the training dataset 250 until at least part of the parameters of the CNN 240 converge, so that final model parameters are obtained. The model training and application process will be further described below in combination with the example environment for vehicle damage assessment in one embodiment of the disclosure.

Figure 3:
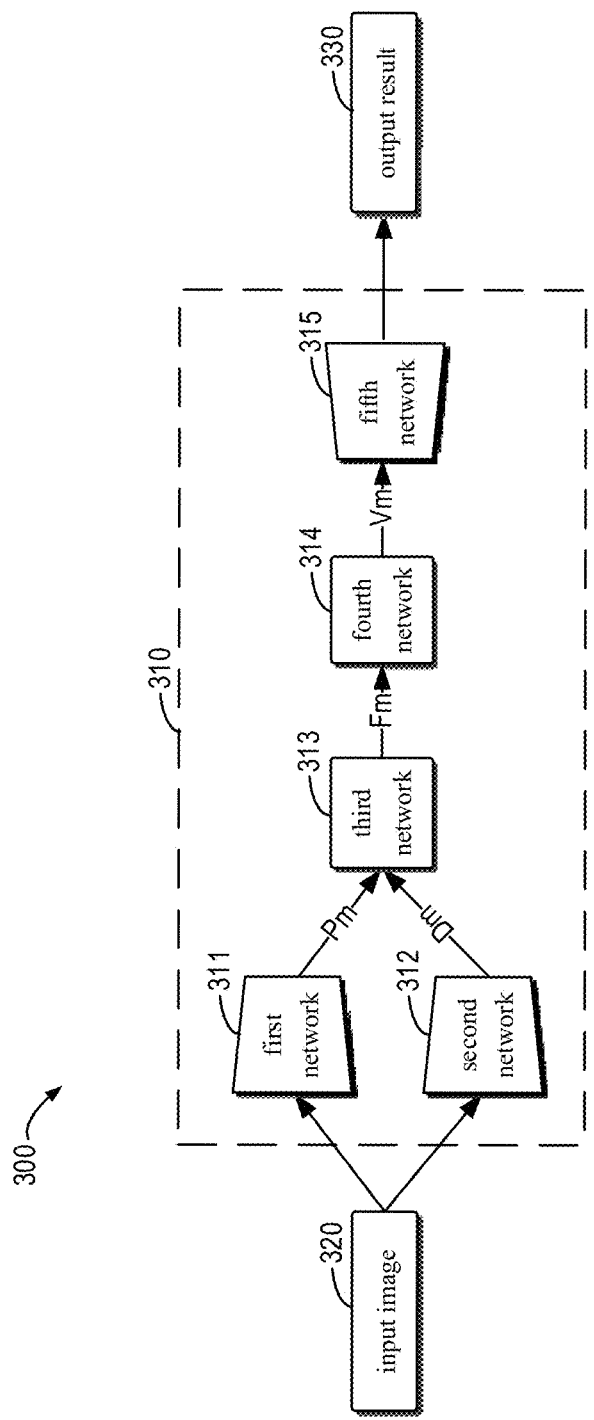
FIG. 3 is a schematic diagram of an example environment for vehicle damage assessment according to some embodiments of the disclosure.

FIG. 3 is a schematic diagram of an example environment 300 for vehicle damage assessment in one embodiment of the disclosure. As shown in FIG. 3, the illustrative environment 300 includes a CNN 310, an input image 320, and an output result 330. The CNN 310 may be implemented in the computing device 100 shown in FIG. 1 or the computing device 200 shown in FIG. 2, and further includes a plurality of networks such as a first convolutional neural network 311, a second convolutional neural network 312, a third convolutional neural network 313, a fourth convolutional neural network 314, and a fifth convolutional neural network 315.

In some embodiments, the first convolutional neural network 311 is configured for extracting a first feature Pm characterizing a part of a vehicle from the input image 320, the second convolutional neural network 312 is configured for extracting a second feature Dm characterizing a damage type of the vehicle from the input image 320, the third convolutional neural network 313 is configured for integrating the first feature Pm and the second feature Dm into a third feature Fm, the fourth convolutional neural network 314 is configured for converting the third feature Fm into a characteristic vector Vm, and the fifth convolutional neural network 315 is configured for determining a damage recognition result of the vehicle (namely, the output result 330). In FIG. 3, an output of the first convolutional neural network 311 and an output of the second convolutional neural network 312 are connected to an input of the third convolutional neural network 313, an output of the third convolutional neural network 313 is connected to an input of the fourth convolutional neural network 314, and an output of the fourth convolutional neural network 314 is connected to an input of the fifth convolutional neural network 315. It should be understood that above connection relations are only illustrative, and the CNN 310 can alternatively be configured using other connection relations.

For example, when the input image 320 is input to the CNN 310, the first convolutional neural network 311 and the second convolutional neural network 312 can synchronously extract respective features from the input image 320. Alternatively or additionally, although not shown in the figures, the first convolutional neural network 311 and the second convolutional neural network 312 sequentially extract features from the input image 320.

In some embodiments, the first convolutional neural network 311 extracts a first feature Pm characterizing a part of a damaged vehicle from the input image, and the second convolutional neural network 312 extracts a second feature Dm characterizing a damage type of the damaged vehicle from the input image 320.

Herein, the dimension of Pm is H*W*Cp, the dimension of Dm is H*W*Cd. and H and W respectively refer to the height and width of a characteristic tensor in pixels, so that pixel-level vehicle part recognition and damage type recognition are fulfilled. In a matrix defined by the height H and the width W, vehicle parts and positions thereof in the matrix, or damage types and positions thereof in the matrix are generally represented by 0 or 1, or any value from 0 to 1. In addition, Cp is the number of kinds of vehicle parts, and Cd is the number of damage types. For instance, the vehicle parts include the vehicle door, the front window, the left window, the right window, the left rearview mirror, the right rearview mirror, and the like. The damage types include scratches, indentations, cracks, and the like. It should be noted that the number Cp of kinds of vehicle parts is the total number of vehicle parts capable of being recognized by the computing device 110 or the system. For example, when Cp is equal to 6, the recognition results corresponding to the vehicle door, the front window, the left window, the right window, the left rearview mirror and the right rearview mirror are respectively H*W*Cp1, H*W*Cp2, H*W*Cp3, H*W*Cp4, H*W*Cp5, and H*W*Cp6. Similarly, when Cd is equal to 3, recognition results corresponding to scratches, indentations and cracks are respectively H*W*Cd1, H*W*Cd2, and H*W*Cd3. It should be understood that, for instance, when it is recognized that only the vehicle door is scratched, only effective values of H*W*Cp1 and H*W*Cd1 are output, and the other recognition results are all zero.

The output of the first convolutional neural network 311 and the output of the second convolutional neural network 312 are both connected to the input of the third convolutional neural network 313. The first feature Pm and the second feature Dm are integrated by the third convolutional neural network 313 to generate the third feature Fm which is in turn converted by the fourth convolutional neural network 314 into the characteristic vector Vm.

In some embodiments, the first feature Pm and the second feature Dm are connected in series and are then integrated by the third convolutional neural network 313 into the third feature Fm with a dimension of H*W*(Cp+Cd). For example, the dimension of the first feature Pm is 20*30*32 (namely, the pixel is 20*30, and the number of kinds of vehicle parts is 32) and the dimension of the second feature Dm is 20*30*6 (namely, the pixel is 20*30, and the number of damage types is 6), the dimension of the third feature Fm obtained by integration is 20*30*38. Finally, the third feature Fm is converted by the fourth convolutional neural network 314 into the characteristic vector Vm with a dimension of 10000*1.

Alternatively or additionally, the result of each part in Pm is independently integrated with Dm. For instance, a ith channel Pm,i (i refers to a segmentation result of a ith part) in Pm is integrated with Dm to obtain Fm,i. Specially, Pm,i is copied Cd times to form a tensor Pm,i' with a dimension identical with that of Dm, and then Fm,i is obtained by calculation according to Fm,i=Pm,i'*Dm, where "*" refers to multiplication of corresponding elements in the tensor. Afterwards, each Fm,i is converted by the fourth convolutional neural network into Vm,i. For example, the dimension of Pm,i is 20*30*1 and the dimension of Pm,i' and the dimension of Dm are 20*30*6, the dimension of the feature tensor Fm,i obtained by integration is 20*30*6, and the dimension of the characteristic vector Vm,i obtained by conversion is 10000*1.

It should be understood that the characteristic vector is in the form of a floating-point matrix (one-dimensional) instead of being in the form of image data or the two-dimensional matrix mentioned above, to serve as an input of the fifth convolutional neural network 315 to carry out an operation to obtain a final damage recognition result. For Cp kinds of vehicle parts, a damage classification network includes Cp corresponding branches. As to the first integration method mentioned above, each branch outputs a damage type of the corresponding part with Vm as an input. As for the second integration method mentioned above, a recognition result for the damage type of the ith part is obtained with Vm,i as an input of the ith branch, and finally, the recognition results obtained by all the branches are integrated to obtain recognition results of all damaged parts and damage types in the input image or video.

The technical solution described above is only illustrative, and is not intended to limit the disclosure. It should be understood that the networks can also be configured in other manners or according to other connection relations. For a clearer explanation of the principle of the above-mentioned solution, the vehicle damage assessment process is described in more detail with reference to FIG. 4.

Figure 4:
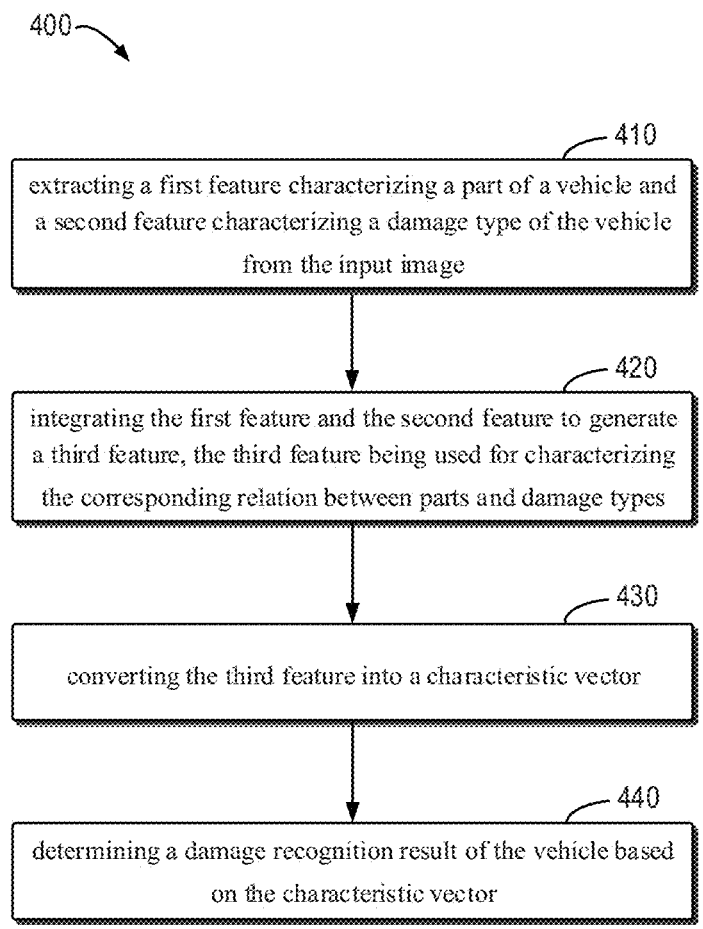
FIG. 4 is a flow diagram of a vehicle damage assessment process according to some embodiments of the disclosure.

FIG. 4 is a flow diagram of the vehicle damage assessment process 400 in one embodiment of the disclosure. The process 400 may be implemented by means of the computing device 110 in FIG. 1 or the computing device 210 in FIG. 2, and the computing devices may be independent devices disposed on a server side or a user side. To facilitate discussion, the process 400 is described in combination with FIG. 2 and FIG. 3.

In Step 410, the computing device 210 extracts a first feature characterizing a part of a vehicle and a second feature characterizing a damage type of the vehicle from the input image 220. For example, as shown in FIG. 3, the input image 320 is transmitted to the CNN 310. The CNN 310 includes the pre-constructed first convolutional neural network 311 and the pre-constructed second convolutional neural network 312. For example, the first convolutional neural network 311 and the second convolutional neural network 312 synchronously extract respective features from the input image 320. Alternatively or additionally, the first convolutional neural network 311 and the second convolutional neural network 312 are connected in series to sequentially extract features from the input image 320.

In some embodiments, a first feature Pm is extracted from the input image 320 by the pre-constructed first convolutional neural network 311 which is pre-trained to have a mapping relation between any input images and first features characterizing any parts. For example, the model training system 260 acquires one image of a damaged vehicle from the training dataset 250 and carries out one iteration of the training process using the image to update a corresponding parameter of the first convolutional neural network 311. Preferably, the model training system 260 performs this process repeatedly based on multiple images acquired from the training dataset 250 until at least part of parameters of the first convolutional neural network 311 converge, so that model parameters of the first convolutional neural network 311 are obtained, thus, realizing mapping between any input images and the first features characterizing corresponding parts.

In some embodiments, a second feature Dm is extracted from the input image 320 by the pre-constructed second convolutional neural network 312 which is pre-trained to have a mapping relation between any input images and second features characterizing any damage types. For example, the model training system 260 acquires one image of a damaged vehicle from the training dataset 250 and carried out one iteration of the training process using the image to update a corresponding parameter of the second convolutional neural network 312. Alternatively or additionally, the model training system 260 performs this process repeatedly based on multiple images acquired from the training dataset 250 until at least part of parameters of the second convolutional neural network 312 converge, so that model parameters of the second convolutional neural network 312 are obtained, thus, realizing mapping between any input images and the second features characterizing corresponding damage types.

In Step 420, the computing device 210 integrates the first feature Pm and the second feature Dm to generate a third feature Fm, where the third feature Fm is used for characterizing the corresponding relation between parts and damage types. For example, as shown in FIG. 3, the first feature Pm and the second feature Dm are input by the computing device 210 to the third convolutional neural network 313 which is pre-constructed in the computing device 210.

In some embodiments, the first feature Pm and the second feature Dm are integrated into the third feature Fm by the third convolutional neural network 313 which is pre-trained to have a mapping relation between combinations of the first features characterizing any parts and the second features characterizing any damage types, and corresponding third features obtained by integration. As mentioned above, the integration may be achieved by connecting the first feature Pm and the second feature Dm in series, or integrating the recognition result of each part in Pm with Dm respectively.

In Step 430, the computing device 210 converts the third feature Fm into a characteristic vector Vm. As shown in FIG. 3, the third feature Fm is input by the computing device 210 to the fourth convolutional neural network 314 which is pre-constructed in the computing device 210. For example, the computing device 210 converts the third feature Fm into the characteristic vector Vm by means of the fourth convolutional neural network 314 which is trained to have a mapping relation between any third features obtained by integration and corresponding characteristic vectors obtained by conversion. In some embodiments, the fourth convolutional neural network 314 includes at least one of a convolutional layer, a non-linear layer, and a full-connect layer.

In Step 440, the computing device 210 determines a damage recognition result of the vehicle (namely, the output result 330) based on the characteristic vector Vm. For example, the computing device determines the damage recognition result 330 of the vehicle by using the pre-constructed fifth convolutional neural network 315 which is trained to have a mapping relation between any characteristic vectors obtained by conversion and corresponding damage recognition results.

For example, the model training system 260 acquires corresponding model parameters from the first convolutional neural network 311 and the second convolutional neural network 312, acquires an image of a damaged vehicle from the training dataset 250, and carried out one iteration of the training process using the image to update other networks in the CNN 310. For example, the first convolutional neural network 311 and the second convolutional neural network 312 are trained first, then model parameters of the first convolutional neural network 311 and the second convolutional neural network 312 are fixed to train the third convolutional neural network 313, the fourth convolutional neural network 314, and the fifth convolutional neural network 315 in the CNN 310, and finally, the model parameters are slightly adjusted to serve as model parameters of the CNN 310 of the end-to-end system. Preferably, the model training system 260 performs this process repeatedly based on multiple images acquired from the training dataset 250 until at least part of the parameters of the CNN 310 converge, so that model parameters of the CNN 310 are obtained, thus, realizing mapping between any input images and corresponding recognition results. In this way, damage recognition results can be determined efficiently, and damage recognition results corresponding to input images can be determined based on the input images and the CNN 310.

Compared with the conventional technology, the end-to-end system is adopted in the solution of the disclosure, so that recognition results of damaged parts and recognition results of damage types are output synchronously. Compared with the method based on feature extraction and end classification, the feature learning ability is effectively improved, and the training and prediction process is drastically simplified.

In the above-discussed example scenarios, one or more alternative images similar to the input image 120 or 220 are determined as the output result 130 or 230 by comprehensive indexing of all element feature data in an element library 140 or 240. However, it should be understood that the description of these scenarios is only for the purpose of illustratively explaining embodiments of the disclosure. Different strategies can be selected in different or similar scenarios as actually required to maximize the accuracy of the output result 130 or 230. It should be noted that the application of the technical solution of the disclosure is not limited to the fields of image processing and image recognition in essence, and that the technical solution of the disclosure still possess all the advantages mentioned above when applied to other fields such as retrieval of similar data.

Figure 5:
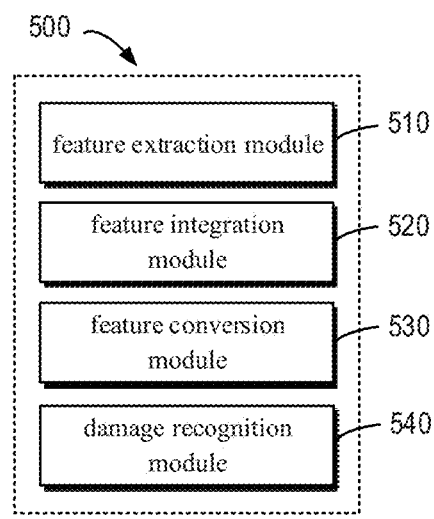
FIG. 5 is a schematic block diagram of an apparatus for vehicle damage assessment according to some embodiments of the disclosure.

FIG. 5 is a schematic block diagram of an apparatus 500 for vehicle damage assessment in one embodiment of the disclosure. The apparatus 500 is disposed in the computing device 110 in FIG. 1 or the computing device 210 in FIG. 2, or is implemented as the computing device 110 or the computing device 210. As shown in FIG. 5, the apparatus 500 includes a feature extraction module 510 configured to extract a first feature characterizing a part of a vehicle and a second feature characterizing a damage type of the vehicle from an input image. The apparatus 500 further includes a feature integration module 520 configured to integrate the first feature and the second feature to generate a third feature characterizing a corresponding relation between the part and the damage type. The apparatus 500 further includes a feature conversion module 530 configured to convert the third feature into a characteristic vector. In addition, the apparatus 500 further includes a damage recognition module 540 configured to determine a damage recognition result based on the characteristic vector.

In some embodiments, the feature extraction module 510 further includes a first feature extraction sub-module configured to extract the first feature from the input image by a pre-constructed first convolutional neural network which is trained to have a mapping relation between the input image and the first feature characterizing the part.

In some embodiments, the feature extraction module 510 further includes a second feature extraction sub-module configured to extract the second feature from the input image by a pre-constructed second convolutional neural network which is trained to have a mapping relation between the input image and the second feature characterizing the damage type.

In some embodiments, the feature integration module 520 is configured to integrate the first feature and the second feature to generate the third feature by a pre-constructed third convolutional neural network which is trained to have a mapping relation between the combination of the first feature characterizing the part and the second feature characterizing the damage type, and the third feature obtained by integration.

In some embodiments, the feature conversion module 530 is configured to convert the third feature into the characteristic vector by a pre-constructed fourth convolutional neural network which is trained to have a mapping relation between the third feature obtained by integration and the characteristic vector obtained by conversion.

In some embodiments, the damage recognition module 540 is configured to determine the damage recognition result of the vehicle by a pre-constructed fifth convolutional neural network which is trained to have a mapping relation between the characteristic vector obtained by conversion and the damage recognition result.

In some embodiments, the first convolutional neural network and the second convolutional neural network are respectively trained to determine respective network weights, and the third convolutional neural network, the fourth convolutional neural network, and the fifth convolutional neural network are acquired by further training based on the network weights.

In some embodiments, the fourth convolutional neural network includes at least one of a convolutional layer, a non-linear layer and a full-connect layer.

According to one or more implementations of the disclosure, damaged parts and damage types of vehicles can be determined in an end-to-end way based on input images by means of deep-learning convolutional neural networks. Compared with the conventional method based on feature extraction and an end classifier (such as SVM or xgboost), the full-link deep-learning technique in the disclosure have remarkable advantages in calculation efficiency, recognition performance, structural flexibility, and the like.

Figure 6:
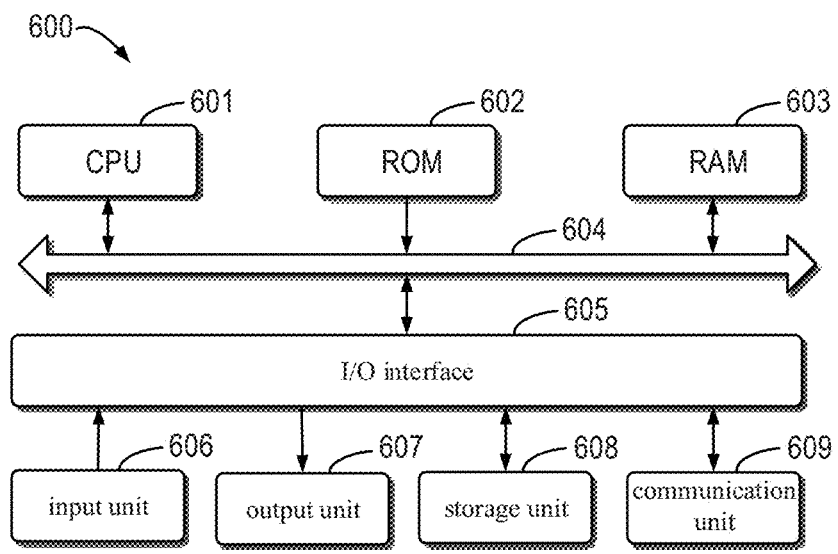
FIG. 6 is a block diagram of a computing device capable of implementing multiple embodiments of the disclosure.

FIG. 6 shows a schematic block diagram of an example device 600 capable of implementing embodiments of the present disclosure. The device 600 may be used to implement the computing device 110 in FIG. 1 or the computing device 01 in FIG. 2. As shown in the figure, the device 600 includes a central processing unit (CPU) 601 that may perform various appropriate actions and processing in accordance with computer program instructions stored in a read only memory (ROM) 602 or computer program instructions loaded into a random access memory (RAM) 603 from a storage unit 608. In the RAM 603, various programs and data required for the operation of the device 600 may also be stored. The CPU 601, the ROM 602, and the RAM 603 are connected to each other through a bus 604. An input/output (I/O) interface 605 is also coupled to the bus 604.

A plurality of components in the device 600 are coupled to the I/O interface 605, including: an input unit 606, such as a keyboard or a mouse; an output unit 607, such as various types of displays, or speakers; the storage unit 608, such as a disk or an optical disk; and a communication unit 609 such as a network card, a modem, or a wireless communication transceiver. The communication unit 609 allows the device 600 to exchange information/data with other devices over a computer network such as the Internet and/or various telecommunication networks.

The processing unit 601 performs the various methods and processes described above, such as the process 300 and/or the process 400. For example, in some embodiments, the process 300 and/or the process 400 may be implemented as a computer software program that is tangibly embodied in a machine readable medium, such as the storage unit 608. In some embodiments, some or all of the computer programs may be loaded and/or installed onto the device 600 via the ROM 602 and/or the communication unit 609. When a computer program is loaded into the RAM 603 and executed by the CPU 601, one or more of the actions or steps of the process 300 and/or the process 400 described above may be performed. Alternatively, in other embodiments, the CPU 601 may be configured to perform the process 300 and/or the process 400 by any other suitable means (e.g., by means of firmware).

The functions described herein above may be performed, at least in part, by one or more hardware logic components. For example, and without limitation, types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various actions or steps are described in a specific order, this should not be understood that such actions or steps are required to be performed in the specific order shown or in sequential order, or all illustrated actions or steps should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable subcombination.

Although embodiments of the present disclosure are described in language specific to structural features and/or method logic actions, it should be understood that the subject matter defined in the appended claims is not limited to the specific features or actions described above. Instead, the specific features and actions described above are merely examples of implementing the claims.

What is claimed is:

1. A method for vehicle damage assessment, the method comprising:
    extracting, from an input image, a first feature characterizing a part of a vehicle and a second feature characterizing a damage type of the vehicle;
    integrating the first feature and the second feature to generate a third feature characterizing a corresponding relation between the part and the damage type;
    converting the third feature into a characteristic vector; and
    determining a damage recognition result of the vehicle based on the characteristic vector, wherein the method is performed by a neural network comprising a first convolutional neural network, a second convolutional neural network, and a given post convolutional neural network, wherein the neural network is trained by:
    collecting a set of images of damaged vehicles from a database;
    training the first convolutional neural network by using first images in the set of images to obtain a first parameter of the first convolutional neural network, the first convolutional neural network being trained to have a mapping relation between the input image and the first feature characterizing the part of the vehicle;
    training the second convolutional neural network by using second images in the set of images to obtain a second parameter of the second convolutional neural network, the second convolutional neural network being trained to have a mapping relation between the input image and the second feature characterizing the damage type; and
    training the post convolutional neural network, wherein during training the post convolutional neural network: the first parameter of the first convolutional neural network and the second parameter of the second convolutional neural network are fixed, the third images in the set of image are used as inputs of the first convolutional neural network and the second convolutional neural network, and a first output of the first convolutional neural network and a second output of the second convolutional neural network are used as inputs of the given post convolutional neural network, wherein the third convolutional neural network being trained to have a mapping relation between a combination of the first feature characterizing the part and the second feature characterizing the damage type, and the damage recognition result.

2. The method according to claim 1, wherein the extracting the first feature characterizing the part of vehicle comprises:
    extracting the first feature from the input image by the first convolutional neural network.

3. The method according to claim 2, wherein the extracting the second feature characterizing the damage type of the vehicle comprises:
    extracting the second feature from the input image by the second convolutional neural network.

4. The method according to claim 3, wherein the post convolutional neural network comprises a third convolutional neural network, and the generating the third feature comprises:
    integrating the first feature and the second feature to generate the third feature by the third convolutional neural network, the third convolutional neural network being trained to have a mapping relation between the combination of the first feature characterizing the part and the second feature characterizing the damage type, and the third feature obtained by integration.

5. The method according to claim 4, wherein the post convolutional neural network comprises a fourth convolutional neural network, and the converting the third feature into the characteristic vector comprises:
    converting the third feature into the characteristic vector by the fourth convolutional neural network, the fourth convolutional neural network being trained to have a mapping relation between the third feature obtained by integration and the characteristic vector obtained by conversion.

6. The method according to claim 5, wherein the post convolutional neural network comprises a fifth convolutional neural network, and the determining the damage recognition result of the vehicle comprises:
    determining the damage recognition result of the vehicle by the fifth convolutional neural network, the fifth convolutional neural network being trained to have a mapping relation between the characteristic vector obtained by conversion and the damage recognition result.

7. The method according to claim 5, wherein the fourth convolutional neural network comprises at least one of a convolutional layer, a non-linear layer and a full-connect layer.

8. An apparatus for vehicle damage assessment, the apparatus comprising:
at least one processor; and
a memory storing instructions, wherein the instructions when executed by the at least one processor, cause the at least one processor to perform operations, the operations comprising:
extracting a first feature characterizing a part of a vehicle and a second feature characterizing a damage type of the vehicle from an input image;
integrating the first feature and the second feature to generate a third feature which characterizes a corresponding relation between the part and the damage type;
converting the third feature into a characteristic vector; and
determining a damage recognition result of the vehicle based on the characteristic vector, wherein the operations are performed by a neural network comprising a first convolutional neural network, a second convolutional neural network, and a given post convolutional neural network, wherein the neural network is trained by:
collecting a set of images of damaged vehicles from a database;
training the first convolutional neural network by using first images in the set of images to obtain a first parameter of the first convolutional neural network, the first convolutional neural network being trained to have a mapping relation between the input image and the first feature characterizing the part of the vehicle;
training the second convolutional neural network by using second images in the set of images to obtain a second parameter of the second convolutional neural network, the second convolutional neural network being trained to have a mapping relation between the input image and the second feature characterizing the damage type; and
training the post convolutional neural network, wherein during training the post convolutional neural network:
the first parameter of the first convolutional neural network and the second parameter of the second convolutional neural network are fixed, third images in the set of image are used as inputs of the first convolutional neural network and the second convolutional neural network, and a first output of the first convolutional neural network and a second output of the second convolutional neural network are used as inputs of the given post convolutional neural network, wherein the third convolutional neural network being trained to have a mapping relation between a combination of the first feature characterizing the part and the second feature characterizing the damage type, and the damage recognition result.

9. The apparatus according to claim 8, wherein the extracting the first feature characterizing the part of vehicle comprises:
extracting the first feature from the input image by the first convolutional neural network.

10. The apparatus according to claim 9, wherein the extracting the second feature characterizing the damage type of the vehicle comprises:
extracting the second feature by the second convolutional neural network.

11. The apparatus according to claim 10, wherein the post convolutional neural network comprises a third convolutional neural network, and the generating the third feature comprises integrating the first feature and the second feature to generate the third feature by the third convolutional neural network, the third convolutional neural network being trained to have a mapping relation between the combination of the first feature characterizing the part and the second feature characterizing the damage type, and the third feature obtained by integration.

12. The apparatus according to claim 11, wherein the post convolutional neural network comprises a fourth convolutional neural network, and the converting the third feature into the characteristic vector comprises converting the third feature into the characteristic vector by the fourth convolutional neural network, the fourth convolutional neural network being trained to have a mapping relation between the third feature obtained by integration and the characteristic vector obtained by conversion.

13. The apparatus according to claim 12, wherein the post convolutional neural network comprises a fifth convolutional neural network, and the determining the damage recognition result of the vehicle comprises determining the damage recognition result by the fifth convolutional neural network, the fifth convolutional neural network being trained to have a mapping relation between the characteristic vector obtained by conversion and the damage recognition result.

14. The apparatus according to claim 12, wherein the fourth convolutional neural network comprises at least one of a convolutional layer, the non-linear layer and a full-connect layer.

15. A non-transitory computer-readable storage medium, having a computer program stored therein, wherein the computer program, when executed by a processor, causes the processor to perform operations, the operation comprising:
extracting, from an input image, a first feature characterizing a part of a vehicle and a second feature characterizing a damage type of the vehicle;
integrating the first feature and the second feature to generate a third feature characterizing a corresponding relation between the part and the damage type;
converting the third feature into a characteristic vector; and
determining a damage recognition result of the vehicle based on the characteristic vector, wherein the method is performed by a neural network comprising a first convolutional neural network, a second convolutional neural network, and a given post convolutional neural network, wherein the neural network is trained by:
collecting a set of images of damaged vehicles from a database;
training the first convolutional neural network by using first images in the set of images to obtain a first parameter of the first convolutional neural network, the first convolutional neural network being trained to have a mapping relation between the input image and the first feature characterizing the part of the vehicle;
training the second convolutional neural network by using second images in the set of images to obtain a second parameter of the second convolutional neural network, the second convolutional neural network being trained to have a mapping relation between the input image and the second feature characterizing the damage type; and training the post convolutional neural network, wherein during training the post convolutional neural network: the first parameter of the first convolutional neural network and the second parameter of the second convolutional neural network are fixed, third images in the set of image are used as inputs of the first convolutional neural network and the second convolutional neural network, and a first output of the first convolutional neural network and a second output of the second convolutional neural network are used as inputs of the given post convolutional neural network, wherein the third convolutional neural network being trained to have a mapping relation between a combination of the first feature characterizing the part and the second feature characterizing the damage type, and the damage recognition result.

* * * * *